United States Patent [19]
Besaw et al.

[11] Patent Number: 5,555,412
[45] Date of Patent: Sep. 10, 1996

[54] COMPLIER AND METHOD FOR ALIAS CHECKING IN A COMPLIER

[75] Inventors: Keith V. Besaw; Robert J. Donovan, both of Rochester, Minn.; Shmuel Sagiv, Ramat Hasharon, Israel

[73] Assignee: International Business Machines Corporation, Armonk, N.Y.

[21] Appl. No.: 558,496

[22] Filed: Nov. 16, 1995

Related U.S. Application Data

[63] Continuation of Ser. No. 363,981, Dec. 23, 1994, which is a continuation of Ser. No. 988,090, Dec. 9, 1992.

[51] Int. Cl.$^6$ ............................................. G06F 9/45
[52] U.S. Cl. ............. 395/700; 364/280.4; 364/280.5; 364/DIG. I; 364/973; 364/DIG. II
[58] Field of Search ............................... 395/700, 600; 364/280.4, 280.5, 973

[56] References Cited

U.S. PATENT DOCUMENTS

| | | | |
|---|---|---|---|
| 4,517,640 | 5/1985 | Hattori et al. | 395/250 |
| 4,635,189 | 1/1987 | Kendall | 395/600 |
| 4,714,992 | 12/1987 | Gladney et al. | 395/600 |
| 4,714,996 | 12/1987 | Gladney et al. | 395/600 |
| 4,845,656 | 7/1989 | Nishibe et al. | 395/166 |
| 4,853,843 | 8/1989 | Ecklund | 395/600 |
| 5,043,871 | 8/1991 | Nishigaki et al. | 395/600 |
| 5,050,071 | 9/1991 | Harris et al. | 395/600 |
| 5,101,345 | 3/1992 | MacPhail | 395/600 |
| 5,107,418 | 4/1992 | Cramer et al. | 395/700 |
| 5,146,594 | 9/1992 | Iitsuka | 395/700 |
| 5,278,986 | 1/1994 | Jourdenais et al. | 395/700 |

OTHER PUBLICATIONS

Pyster, A. "Compiler Design and Construction", 1980, pp. 15, 22, and 23.
Horwitz et al., "Dependence Analysis for Pointer Variables," 1989, pp. 28–40.
Neirynck et al., "Computation of Aliases and Support Sets," Oct. 16, 1986, pp. 274–283.
Barth, Jeffrey M., "A Practical Interprocedural Data Flow Analysis Algorithm," Sep. 1978, vol. 21, No. 9, pp. 724–736.
Larus et al., "Detecting Conflicts Between Structure Accesses," Jun. 22–24, 1988, pp. 21–34.
Larus, James Richard, "Restructing Symbolic Programs for Concurrent Execution on Multiprocessors", Report No. UCB/CSD 89/502, May 1989, Computer Science Division (EECS), University of California, Berkeley, California 94720.
Guarna, Vincent J., Jr., "A Technique for Analyzing Pointer and Structure References in Parallel Restructuring Compilers," *Proceedings of the 1988 International Conference on Parallel Processing,* Aug. 15–19, 1988, pp. 211–220.
Hendren, Laurie J., et al., "Parallelizing Programs with Recursive Data Structures," pp. 1–22.
Arthur B. Pyster, Ph.D, "Compiler Design and Construction", 1980, pp. 11–13, 21, 130.
"Code Optimization Across Procedures" by Stephen Richardson et al, Computer, IEEE 1989.
"Compile–Time Detection of Aliasing in Euclid Programs" by James R. Cordy, Software–Practice and Experience, vol. 14(8) 755–768 (Aug. 1984).
"Hybrid Incremental Alias Algorithms" by Thomas J. Marlowe et al, IEEE 1991.

*Primary Examiner*—Alvin E. Oberley
*Assistant Examiner*—Michael T. Richey
*Attorney, Agent, or Firm*—Pryor A. Garnett; Steven W. Roth; Joan Pennington

[57] ABSTRACT

An aliasing method and apparatus carried out on a digital computer are provided for generating an object code from a source program. An aliasing data structure is defined and includes an initial empty check-list for each variable in the source program. A pseudo variable is constructed to represent each predefined large alias class. The pseudo variable is attached to the check-list of each variable included in the predefined alias class. Inverse alias checking upon use of a variable is provided using the check-lists for the variable.

21 Claims, 6 Drawing Sheets

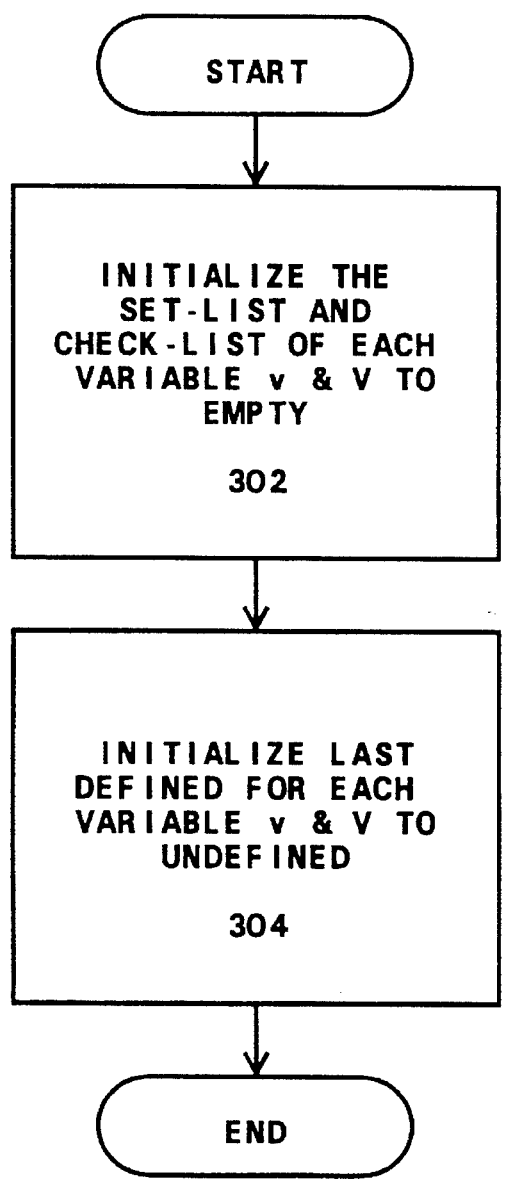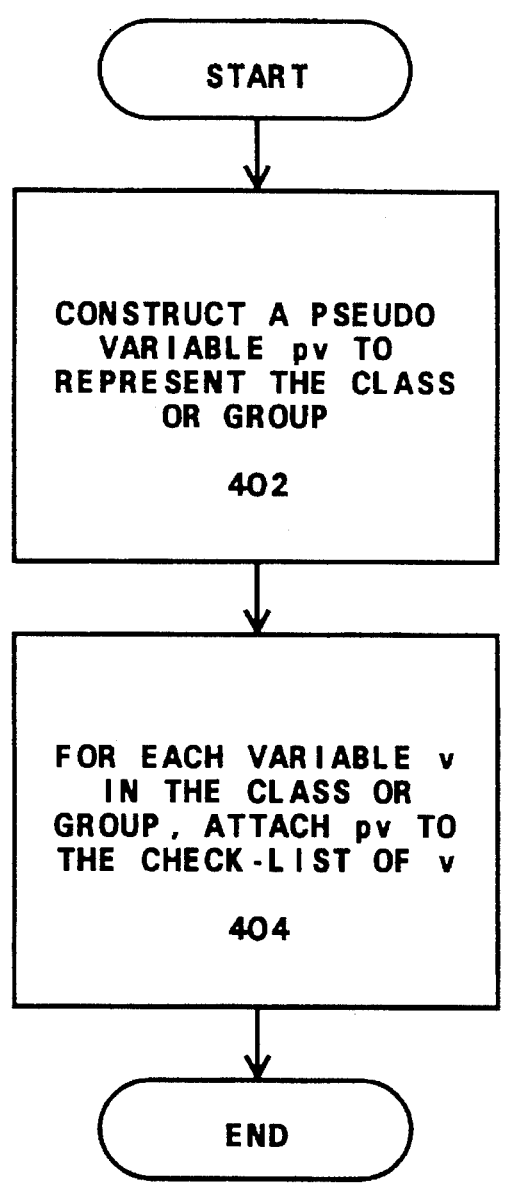

COMPILER AND METHOD FOR ALIAS CHECKING IN A COMPILER

This application is a continuation of application Ser. No. 08/363,981, filed Dec. 23, 1994, now abandoned, which is a continuation of application Ser. No. 07/988,090, filed Dec. 9, 1992, now abandoned.

BACKGROUND OF THE INVENTION

1. Field of the Invention

The invention relates generally to method and apparatus carried out on a digital computer for converting a source program to an object code, and more particularly to an aliasing method and apparatus using alias lists for improving the efficiency of code optimization.

2. Description of the Prior Art

Aliasing in optimizing compilers is described in Aho, Sethi and Ullman, "Compilers: Principles, Techniques and Tools", Addison-Wesley (1986), Chpt. 10, pp. 585–722.

Other prior art examples include:

J Barth, "A Practical Interprocedural Data Flow Analysis Algorithm", CACM Vol. 21, No. 9, September 1978, pp. 724–736.

A. J. Demers, A. Neirynck, P. Panagaden; "Computation of Aliases and Support Sets", ACM Symposium on Principles of Programming Languages, 1987, pp. 274–283.

S. Horwitz, P. Pfeiffer, and T. Reps, "Dependence Analysis for Pointer Variables", SIGPLAN Conference on Programming Languages Design and Implementation, 1989, pp. 28–40.

J. Larus and P. Hilfinger, "Detecting Conflicts Between Structure Access", SIGPLAN Conference on Programming Languages Design and Implementation, 1988, pp. 21–34.

In general, if two or more expressions denote the same memory address, the expressions are aliases of one another. The presence of pointers and procedures in data flow analysis introduce aliases and complexity.

U.S. Pat. No. 5,107,418 describes a deficiency of the prior art in that optimizing compilers do not process loops that include procedure calls or de-references of pointers because these events must be treated as though they reference all variables in the program. Attempting to include procedure calls and de-references of pointers using the known techniques would result in a scalar data dependence graph that is slow to construct and too large for available memory. U.S. Pat. No. 5,107,418 discloses a method for representing scalar data dependencies for an optimizing compiler.

References to large structures, pointer de-references and procedure calls, along with debug, exception, and multi-tasking synchronization points, all have an effect on variables not directly referenced by the operation. At the point the operation is performed, optimization must be inhibited on expressions containing these indirectly referenced variables as operands. For example:

z=x+y;

*q=exp1;

w=x+y;

If the variable x happens to be an external variable, then there is a chance that the assignment using the pointer de-reference to q may modify the external variable x. Therefore, x+y will have to be evaluated twice rather than just once at the assignment to z, saving the result in a register to be later assigned to w.

A problem results when the number of indirectly referenced variables is very large. For example, an assignment to a pointer based variable such as *q can indirectly affect hundreds of external variables. If there are many pointer de-references or many of the other indirect effects, then optimization can spend a significant amount of time just updating its internal data structures to reflect the possible definitions or uses that are occurring.

Because this efficiency problem occurs most often due to constructs such as the pointer de-reference, it is basically an aliasing problem. The variables that share or potentially share the same space as a given variable are the variable's aliases.

It is desirable to provide enough flexibility to accommodate procedure calls and exception handling in an aliasing model and thereby solve the efficiency problem for those constructs also.

It would also be beneficial to have the flexibility to add compiler generated variables that are aliased to user variables to provide special views of user variables.

SUMMARY OF THE INVENTION

Important objects of the present invention are to provide a method and apparatus for converting a source program to an object code overcoming disadvantages of arrangements used in the past; to provide an aliasing method and apparatus using a combination of direct effect and inverse checking that improves the efficiency of code optimization and provides more flexibility than methods used in the past which rely exclusively on a direct effect apparatus. The present invention not only provides an inverted method with its inherent flexibility and efficiency on certain classes of source programs; but also provides a method which combines direct and inverse alias checking using each where most advantageous.

In brief, the objects and advantages of the present invention are achieved by an aliasing method and apparatus carried out on a digital computer for generating an object code from a source program. An aliasing data structure is constructed and includes a set-list and a check-list of each variable in the source program. Set-lists are used in the direct effect portion of the present invention. Check-lists are used in the inverted checking portion of the present invention. A pseudo variable is constructed to represent each predefined large class of aliased variables and is attached to the set-list and check-list of each of the variables in the class. A redefinition group pseudo variable is constructed for each redefinition group or predefined large group of variables potentially defined at one or more points in the source program, for example, at a function call. The redefinition group pseudo variable is only attached to the check-list of each variable included in the redefinition group. Variable update management routines for data flow analysis include a set defined operation for identifying possible redefinitions of variables utilizing set-lists; and a find last definition operation for identifying a last possible redefinition of a variable utilizing check-lists.

BRIEF DESCRIPTION OF THE DRAWING

The present invention together with the above and other objects and advantages may best be understood from the following detailed description of the embodiment of the invention illustrated in the drawings, wherein:

FIG. 3 is a logic flow diagram illustrating the initialization of the data structures of the present invention;

FIG. 4 is a logic flow diagram illustrating the construction of a pseudo variable to represent a class of aliased variables or a group of variables possibly defined at a point or points within the source program and the addition of the pseudo variable to the check-lists of the variables in the alias class or redefinition group;

DETAILED DESCRIPTION OF THE PREFERRED EMBODIMENT

Figure 1:
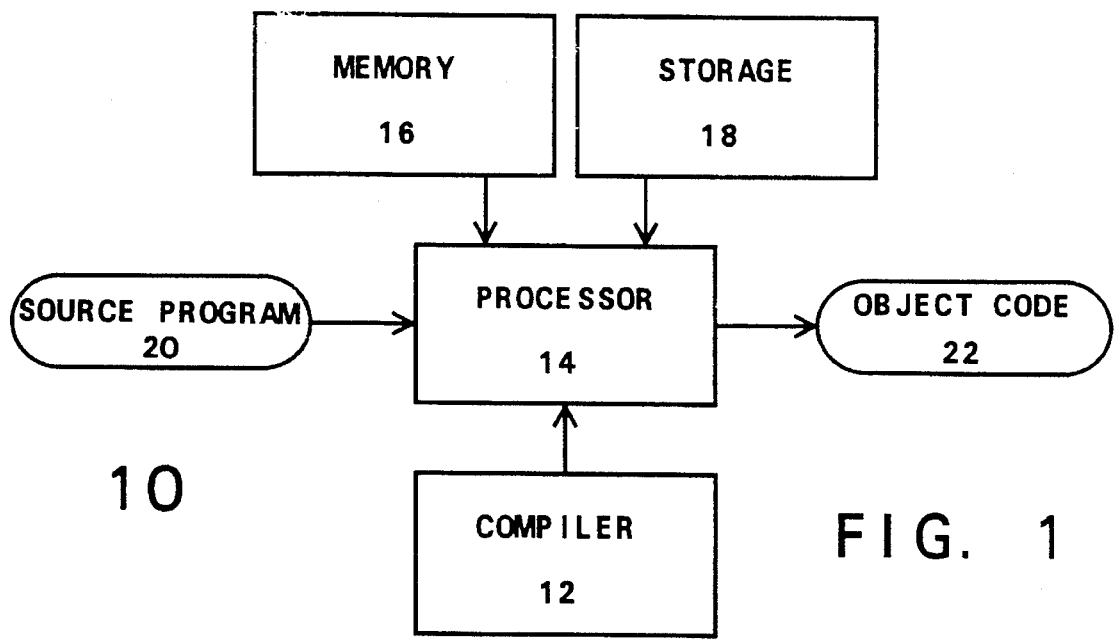
FIG. 1 is a block diagram representation of a computer system embodying the present invention.

In FIG. 1 there is shown a block diagram representation of a computer system 10 for carrying out a method of the invention represented by a compiler 12. Computer system 10 includes a processor 14, memory 16 and storage 18 adapted for use with compiler 12 for translating a source program 20 to an object code 22. Preferably an IBM AS/400 is used for computer system 10; however, various other commercially available processors could be used. Processor 14 is suitably programmed to execute the flowcharts of FIGS. 2–8 of the invention.

Figure 2:
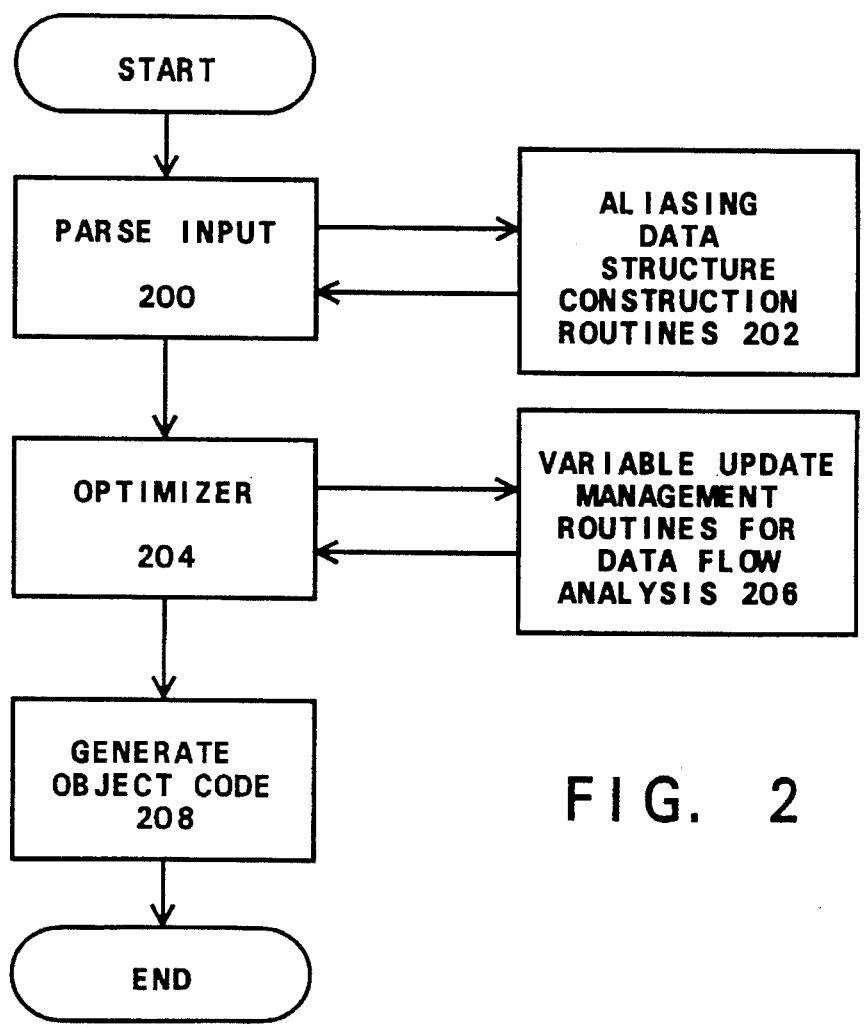
FIG. 2 is a logic flow diagram illustrating a compiler of FIG. 1.

In FIG. 2 there is shown a block diagram illustrating the compiler 12 of the invention. A first module 200 labelled PARSE INPUT receives the source program and is coupled to a second module 202 labelled ALIASING DATA STRUCTURE CONSTRUCTION ROUTINES. The ALIASING DATA STRUCTURE CONSTRUCTION ROUTINES module 202 is called by the PARSE INPUT module 200. The ALIASING DATA STRUCTURE CONSTRUCTION ROUTINES module 202 includes processes to INITIALIZE ALIASING DATA STRUCTURE illustrated and described with respect to FIG. 3, CONSTRUCT PSEUDO VARIABLE illustrated and described with respect to FIG. 4, and CONSTRUCT DIRECT ALIASES OF VARIABLE illustrated and described with respect to FIG. 5.

An OPTIMIZER module 204 coupled to the output of the PARSE INPUT module 200 calls a fourth module 206 labelled VARIABLE UPDATE MANAGEMENT ROUTINES FOR DATA FLOW ANALYSIS. The VARIABLE UPDATE MANAGEMENT ROUTINES FOR DATA FLOW ANALYSIS includes a SET DEFINED routine illustrated and described with respect to FIG. 6 and a FIND LAST DEFINITION routine illustrated and described with respect to FIG. 7. A GENERATE OBJECT CODE module 208 is coupled to the output of the optimizer module 204.

Referring to FIG. 3, there is shown a logic flow diagram for the routine INITIALIZE ALIASING DATA STRUCTURE. This routine is called from the PARSE INPUT module to initialize the data structures. As expressed in FIG. 3, V={v1, v2, . . . , v3} is the set of program variables and v is one member of the set V. The sequential steps begin at block 302 for attaching an empty set-list and an empty check-list to each variable and pseudo variable which may be relevant. The next sequential step is block 304 which places Last Defined in an undefined state for each variable and pseudo variable which may be relevant.

Referring to FIG. 4, there is shown a logic flow diagram for the routine CONSTRUCT PSEUDO VARIABLE. This routine is called from PARSE INPUT module 200 once for each large class of aliased variables and once for each group of variables possibly redefined at one or more points in the source program. Examples of large alias classes include members of Fortran COMMON blocks and members of large structures in other languages. An example of a redefinition group is the address taken variables which are possibly defined at each assignment through a pointer de-reference. Another example of a redefinition group is the external variables which are possibly defined at each function call. A compiler generated variable can be constructed along with the redefinition group pseudo variable, for example, to represent unique elements of an array or unique members of a pointer based structure. Compiler generated variables can be aliased to user variables included in the source program 20 to provide Special views of user variables. The sequential steps begin at block 402 which constructs a pseudo variable pv to represent the alias class or redefinition group. The next sequential step is block 404 which attaches the pseudo variable pv to the check-list of each variable v in the alias class or redefinition group.

Figure 5:
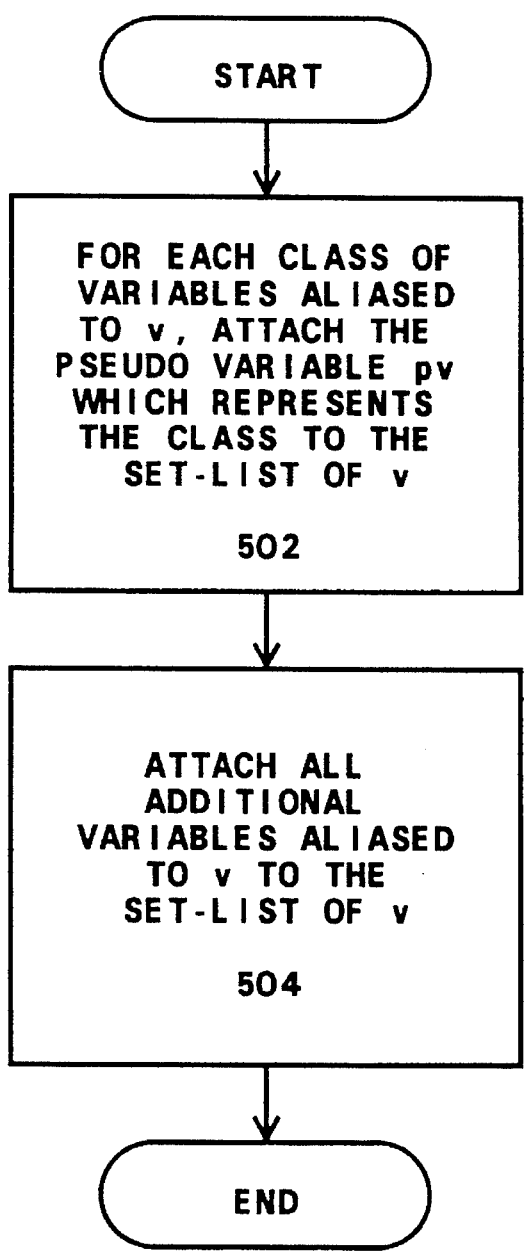
FIG. 5 is a logic flow diagram illustrating the construction of a set-list for a variable.

Referring to FIG. 5, there is shown a logic flow diagram for the routine CONSTRUCT DIRECT ALIASES 0F VARIABLE. As shown, this routine is called from PARSE INPUT module 200 once for each program variable after all of the aliases and pseudo variables in the program are known. CONSTRUCT DIRECT ALIASES OF VARIABLE (v) builds the set-list of variables including pseudo variables that will be directly marked as redefined whenever the variable v is redefined. When a variable v is a member of a large class of aliased variables, only the pseudo variable representing the class will be included in the set-list of v. The sequential steps begin at block 502 which attaches to the set-list of v each pseudo variable pv representing an alias class for which v is aliased to all members of the class. The next sequential step is block 504 which attaches to the set-list. of v all variables aliased to v that are not in an alias class whose pseudo variable is already in the set-list of v. Any alias not covered by an earlier defined alias class is handled strictly by the direct part of the method. That is, if variable v1 is aliased to v2 and v1 and v2 have not been included in a common alias class, then v1 is added to the set-list for v2 and v2 is added to the set-list of v1 at block 504.

It should be understood that the illustrated routines INITIALIZE ALIASING DATA STRUCTURE, CONSTRUCT PSEUDO VARIABLE, and CONSTRUCT DIRECT ALIASES 0F VARIABLE provide one method of constructing the pseudo variables, set-lists, and check-lists. There is enough flexibility in how the PARSE INPUT module 200 interacts with the ALIASING DATA STRUCTURE CONSTRUCTION ROUTINES 202 to facilitate different methods for constructing the pseudo variables, set-lists, and check-lists. For example, aliases can be added to the set-list of a variable v as they are found by the PARSE INPUT module 200 or even in later phases of the compiler rather than all at once as done by CONSTRUCT DIRECT ALIASES OF VARIABLE. The set-list and check-list data structures are flexible enough to lend themselves as adaptable initialization dependent on the structure of the PARSE INPUT module 200 and the semantics of the language of the source program 20 being compiled.

Figure 9:
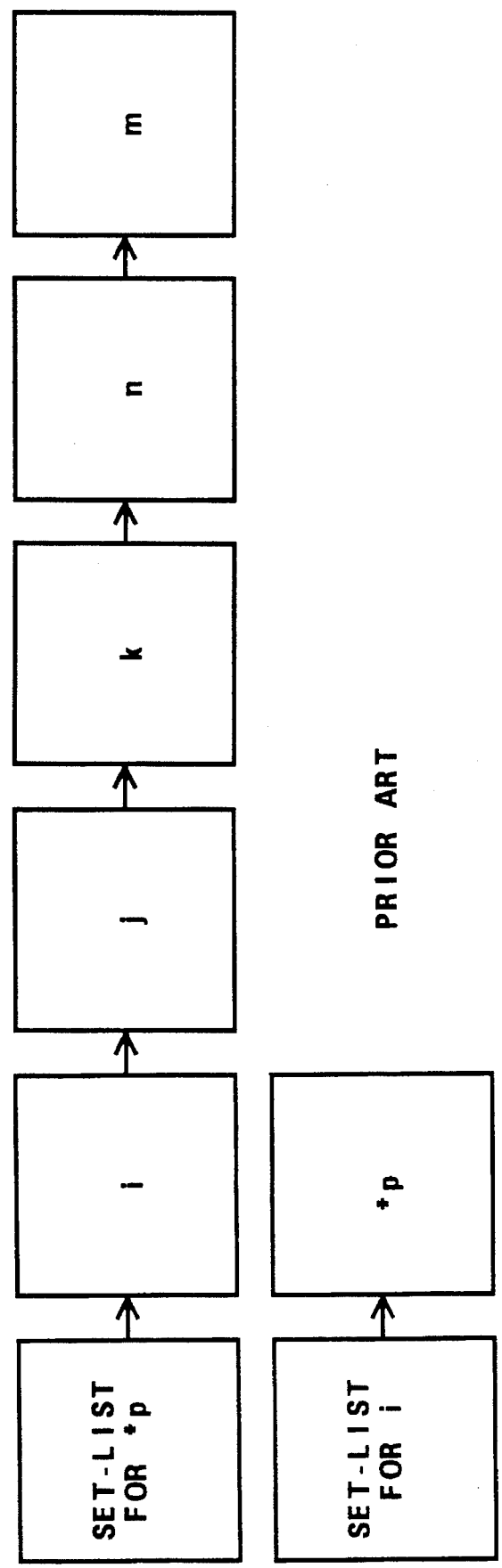
FIG. 9 is a logic flow diagram illustrating a direct only checking method of the prior art.

Operation of the ALIASING DATA STRUCTURE CONSTRUCTION ROUTINES of FIGS. 3, 4 and 5 may be understood by considering the following example. Take the declaration of a pointer based variable along with the declarations of a number of external variables.

int *p;

extern int i, j, k, l, m;

Referring also to FIG. 9, an example of the direct-only approaches in the prior art is shown. While a set-list is illustrated in FIG. 9 to make comparisons with the combined approach of the invention more obvious, the essence of all direct-only approaches is that the variable representing *p must be aliased to all external variables and each external variable, such as the external variable i shown, must be aliased to *p.

Figure 8:
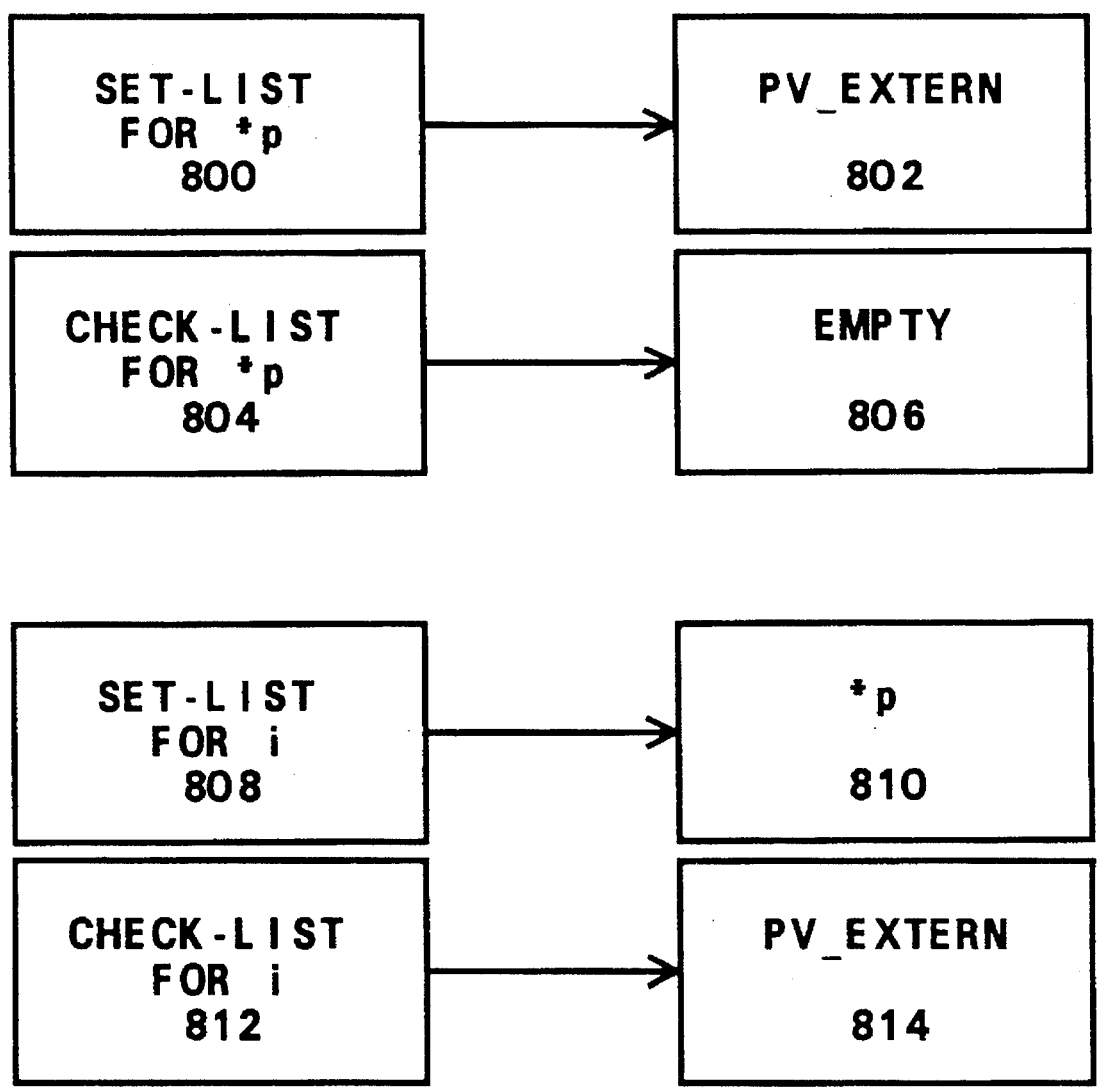
FIG. 8 is a logic flow diagram illustrating a combination of direct and inverse checking methods of the invention.

FIG. 8 illustrates the combined method of the invention. The construction of a pseudo variable PV_EXTERN is required to represent the redefinition group of external variables. PV_EXTERN indicated at blocks 802 and 814 will appear in the set-list of any pointer based variable such as *p indicated at block 800 and in the check-list of all external variables i, j, k, l, m, such as the check-list for external variable i indicated at block 812. Contrast the short set-list of *p in the combined approach in FIG. 8 with the long set-list of *p in the direct approach of FIG. 9. This can lead to significant time efficiencies if the aliases of pointer based variables such as *p have to be traversed often. This can also lead to significant space efficiencies if there are many pointer based variables in the source program as each now requires just a short set-list.

Figure 6:
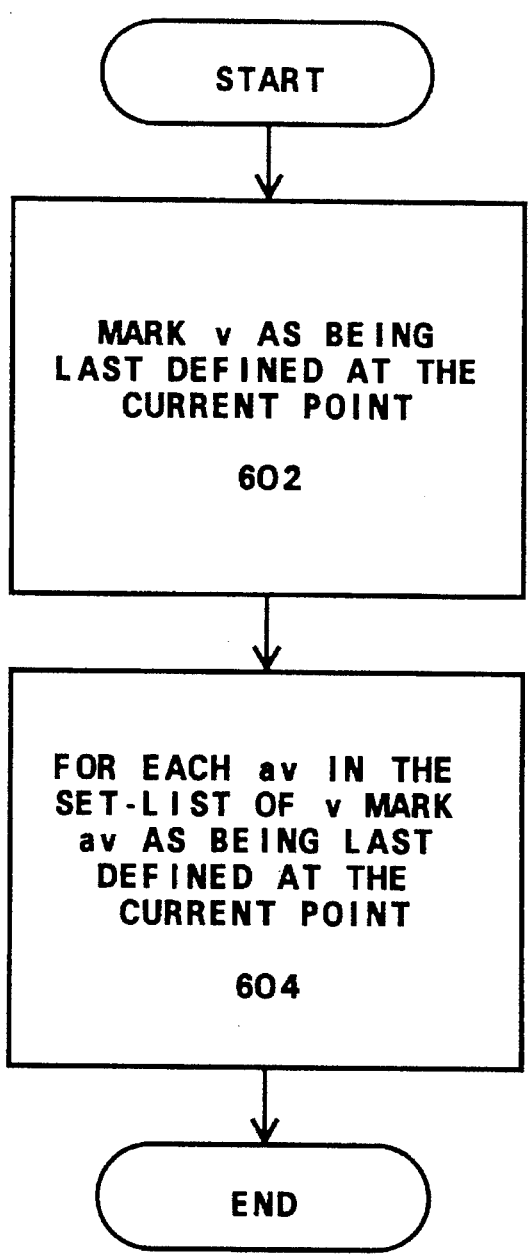
FIG. 6 is a logic flow diagram illustrating a SET DEFINED method and apparatus for data flow analysis of the present invention.

Referring now to FIG. 6, there is shown a logic flow diagram for the routine SET DEFINED (v). This routine marks the variable v and all of the variables including pseudo variables in the set-list of v as having been redefined at the current point in the source program. The routine SET DEFINED is called by the optimizer module 204 at selected points in the program to mark redefinitions or potential redefinitions of variables. For example, the operation SET DEFINED is called for an assignment to a variable. Another example is to call the operation SET DEFINED for the pseudo variable representing external variables at function calls. A first operation is performed at a block 602 labelled MARK v AS BEING LAST DEFINED AT THE CURRENT POINT. A second operation is performed at block 604 labelled FOR EACH av IN THE SET-LIST OF v MARK av AS BEING LAST DEFINED AT THE CURRENT POINT, where av is an alias of variable v or a pseudo variable representing an alias class of variables aliased to variable v.

Figure 7:
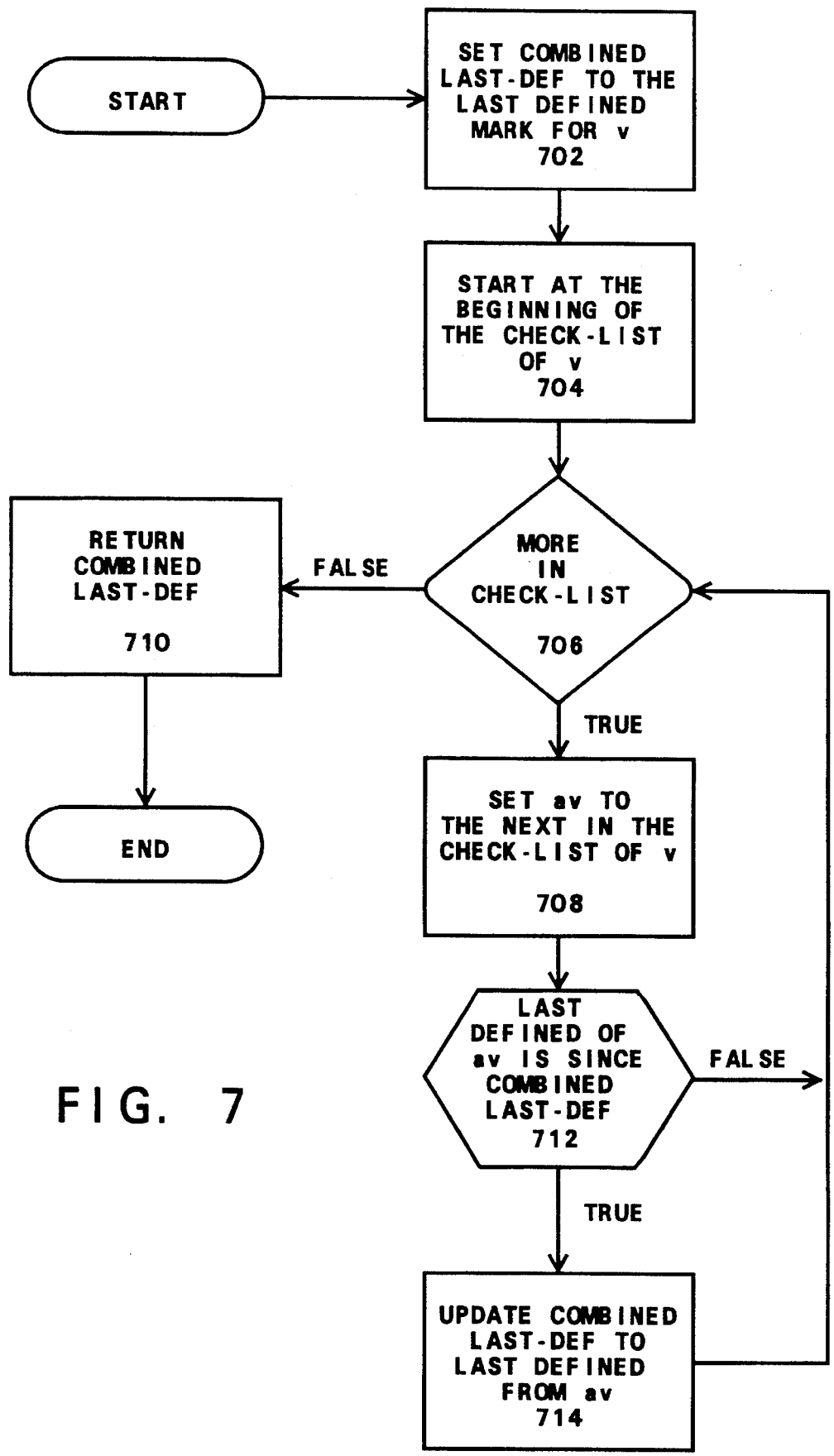
FIG. 7 is a logic flow diagram illustrating a FIND LAST DEFINITION method and apparatus for data flow analysis of the present invention.

Referring to FIG. 7, there is shown a logic flow diagram for the routine FIND LAST DEFINITION (v). This routine finds the last point or closest point to the current point in the source program that v was directly marked as redefined through a call to SET DEFINED or that any variable including any pseudo variable in the check-list of v was directly marked as redefined. The inverse checking that the routine FIND LAST DEFINITION performs using the check-list is an important feature of the uniqueness of the present invention. FIND LAST DEFINITION is called by the optimizer module 204 when a check is needed of whether a variable has been updated since another point on the current path, where v is a variable and a last definition mark is returned. The sequential steps begin at a block 702 labelled SET COMBINED LAST-DEF TO THE LAST DEFINED MARK FOR v. A next step starts at a block 704 labelled START AT THE BEGINNING OF THE CHECK-LIST OF v, and then it is determined whether review of the check-list has been completed as indicated at a decision block 706 labelled MORE IN CHECK-LIST. When false, the combined LAST-DEF is returned as indicated at a block 710 labelled RETURN COMBINED LAST-DEF. Otherwise, when true, the next variable in the check-list of v is obtained as indicated at a block 708 labelled SET av TO THE NEXT IN THE CHECK-LIST OF v. The decision block 712 labelled LAST DEFINED OF av IS SINCE COMBINED LAST-DEF determines if av was defined closer to the current point than v or any of the variables in the check-list checked so far. When true, the combined LAST-DEF is updated at block 714 to av's last definition point. In either case the sequential operations return to decision block 706.

The routines SET DEFINED and FIND LAST DEFINITION are required for optimizations such as common subexpression elimination. Parallel operations SET USED and FIND LAST USE can be constructed similar to SET DEFINED and FIND LAST DEFINITION for optimizations such as store elimination.

SET DEFINED and FIND LAST DEFINITION were designed for the requirements of local optimization within a block. An operation IS DEFINED IN BLOCK can be constructed similar to FIND LAST DEFINITION for use by a global optimizer when constructing block transparencies of expressions. IS DEFINED IN BLOCK would be identical to FIND LAST DEFINITION except that a simple true or false would be returned whenever FIND LAST DEFINITION would have returned a mark within the appropriate block. IS DEFINED IN BLOCK would require SET DEFINED to be called for all definitions in the block.

To show how a check-list and inverse alias checking give improved efficiencies, consider an example program which uses a number of external and pointer based variables as follows.

extern int i, j, k, L, m;

int *p;

X=i+1;

*p=10;

Y=i+1;

FIG. 8 shows the result of applying the ALIASING DATA STRUCTURE CONSTRUCTION ROUTINES of FIGS. 3, 4 and 5 to the example program. PV_EXTERN, the pseudo variable constructed to represent the class of external variables, appears in the set-list of the based variable representing *p illustrated at blocks 800 and 802 and in the check-lists of external variables i, j, k, l and m, illustrated at blocks 812 and 814 for the check-list for i. The based variable *p will also have been added to the set-list of each of the external variables i, j, k, l and m as indicated at blocks 808 and 810 for the set-list for i, assuming the alias class containing *p is small such that it has not had a pseudo variable created for it.

Referring also to FIG. 9, compare the actions taken for assignments and uses using the inverse checking solution of FIG. 8 to the actions taken for assignments and uses using a direct checking solution of FIG. 9. In the direct checking method, *p and all of *p's aliases must be marked as redefined for the assignment to *p. In the inverse checking solution, only *p and PV_EXTERN are marked as redefined. At the use of i, during redundant load elimination, the inverse checking method requires that the check-list of i be examined to determine if there were any redefinitions of variables in i's check-list. While as shown in FIG. 9, the direct method does not utilize a check-list, and, therefore, does not require any additional checking. However, using the inverse checking method, the overhead of the additional checking when used is more than offset by the savings gained at assignments because the long lists of aliases of *p need not be marked as redefined.

The following table summarizes the actions that must be taken for assignments and uses using the inverse checking solution and a direct checking solution.

|  | Prior Art Direct Method | Inverse Method |
|---|---|---|
| Variables that must be marked as redefined at assignment to *p | *p, i, j, k, l, m | *p, PV_EXTERN |
| Variables that must be checked at the use of i | i | i, PV_EXTERN |

The flexibility of the inverse checking method can be demonstrated using two additional examples. In the first example, the invention is used to both simplify and improve the efficiency of procedure calls. A pseudo variable can be generated for every procedure and added to the check-list of all variables potentially defined or used by the procedure. Then, at a call to the procedure, the pseudo variable is simply marked as defined. This has the effect of marking as redefined all variables potentially defined by the procedure.

In the second example, the invention is used to simplify handling of a debug boundary. A debug boundary is a point in the source program where variables that can be displayed and modified by an interactive debugger are forced to storage before this point and obtained from storage after the point. A pseudo variable can be generated and added to the check-list of every variable affected by the debug boundary. Then, at each debug boundary, simply mark the pseudo variable as defined. This has the effect of marking as redefined all variables affected by the debug boundary. As a result, each such variable is reloaded from storage following the debug boundary. Similarly, pseudo variables can be generated to represent groups of variables affected at exception and multi-tasking synchronization points.

In brief summary, benefits of the invention include improved compile-time performance; simplified handling for procedure calls and exception, debug, and multitasking synchronization points; and overall increased flexibility. The compiler 12 is more efficient in handling constructs that affect large numbers of user variables such as assignments to pointer based variables and procedure calls than conventional compilers.

It should be understood that while the names set-list and check-list imply implementation as a list structure, a list structure is not required. A data structure such as a bit matrix can be used to implement the set-lists and a second bit matrix for the check-lists with only a small loss of flexibility. Implementing each of the above defined set-lists and check-lists preferably is provided by using a linked list rather than conventional bit matrices. Traversing the linked list can provide a significant performance increase over the extraction of bits from a row of a sparse matrix. In addition, an implementation using lists allows greater flexibility.

While the invention has been described with reference to details of the illustrated embodiments, these details are not intended to limit the scope of the invention as defined in the appended claims.

What is claimed and desired to be secured by Letters Patent of the United States is:

1. A digital computer implemented method for converting a source program to an object code comprising the steps of:

receiving the source program; the received source program including a plurality of variables, and said plurality of variables including a plurality of aliased variables; said plurality of aliased variables including a plurality of predefined large alias classes and other aliased variables not included in a predefined large alias class;

initializing an aliasing data structure for each said variable in the source program and attaching for each said variable in the source program both a corresponding empty check-list and a corresponding empty set-list;

constructing a respective pseudo variable to represent each said predefined large alias class in the source program and, for each variable included within each said predefined large alias class attaching said respective pseudo variable to said corresponding check-lists;

constructing set lists of each said variable in the source program including the steps of, for each variable included within each said predefined large alias class attaching said respective pseudo variable to each of said corresponding set-lists and, for each said variable in the source program attaching all additional other variables aliased to each said variable to said corresponding set-list for each said variable; said additional other variables being included in said other aliased variables not included in a predefined large alias class;

utilizing said set-lists and said check lists for data flow analysis and optimizing the source program; and utilizing said optimized source program for generating the object code.

2. A method of alias checking as recited in claim 1 wherein said step of utilizing said set-lists and said check lists for data flow analysis and optimizing the source program includes the step of using said set-list for direct alias checking.

3. A method of alias checking as recited in claim 2 wherein said step of utilizing said set-lists and said check lists for data flow analysis and optimizing the source program includes the step of using said check-list for inverse alias checking.

4. A method of alias checking as recited in claim 1 wherein said step of utilizing said set-lists and said check lists for data flow analysis and optimizing the source program includes the step of identifying a last defined variable or pseudo variable attached to said corresponding check-list for a selected variable.

5. A method of alias checking as recited in claim 1 wherein said step of constructing a respective pseudo variable further includes the step of constructing a respective pseudo variable to represent each redefinition group of variables potentially redefined at a point in the source program.

6. A method of alias checking as recited in claim 5 further includes the step of attaching said respective redefinition group pseudo variable to said check-list.

7. A method of alias checking as recited in claim 5 wherein said respective redefinition group pseudo variable is constructed for a procedure call in the source program.

8. A method of alias checking as recited in claim 5 wherein said respective redefinition group pseudo variable is constructed for exception and debug boundaries in the source program.

9. A method of alias checking as recited in claim 5 wherein said respective redefinition group pseudo variable is constructed for multitasking synchronization points in the source program.

10. A method of alias checking as recited in claim 5 wherein said respective redefinition group pseudo variable and a compiler generated variable are constructed to provide special views of user variables.

11. A digital computer implemented method for generating an object code from a source program comprising the steps of:

receiving a source program, the received source program including a plurality of variables, and said plurality of variables including a plurality of aliased variables; said plurality of aliased variables including a plurality of predefined large alias classes and other aliased variables not included in a predefined large alias class;

attaching for each variable in the source program both a corresponding empty set-list and a corresponding empty check-list;

initializing a last defined state for each variable in the source program to an undefined state;

constructing a respective pseudo variable to represent each said predefined large alias class and, for each said aliased variable included within each said predefined large alias class attaching said respective pseudo variable to each of said corresponding check lists;

constructing set lists of each variable in the source program including the steps of, for each said variable included within each said predefined large alias class attaching said respective pseudo variable to each of said corresponding set-lists and, for each said variable in the source program attaching all additional other variables aliased to each said variable to said corresponding set-list for each said variable; said additional other variables being included in said other aliased variables not included in a predefined large alias class;

utilizing said set-lists and said check lists for data flow analysis and optimizing the source program; and at selected points in the source program calling a set defined operation for at least one selected variable for changing said last defined state to indicate a possible redefinition of said at least one selected variable and, for every variable and pseudo variable included within said corresponding set-list for said at least one selected variable changing said last defined state;

at selected points in the source program calling a find last definition operation for a particular selected variable in the source program for identifying a last point in the source program of changing said last defined state for said particular selected variable, for every variable and pseudo variable included within said corresponding check-list of said particular selected variable, identifying said last point in the source program of changing said last defined state; and utilizing the optimized source program for generating the object code.

12. A method as recited in claim 11 wherein said step of constructing set lists further includes the step of initially defining said set-list equal to an alias-list of variables that are marked as used when said each variable is marked as used.

13. A method as recited in claim 12 further includes the step of replacing said variables in an alias class with a pseudo variable representing said alias class for defining said set-list.

14. A method as recited in claim 11 wherein the step of utilizing the optimized source program for generating the object code further includes the step of optimizing said object code generation utilizing said set defined operation and find last definition operation.

15. A compiler for use with a digital computer for converting a source program to an object code comprising:

input means for receiving the source program; the received source program including a plurality of variables, and said plurality of variables including a plurality of aliased variables; said plurality of aliased variables including a plurality of predefined alias classes and other aliased variables not included in a predefined alias class;

means responsive to said input means for defining an aliasing data structure; said aliasing data structure defining means including means for defining a corresponding set-list and a corresponding check-list for each variable in the source program; means for defining a respective pseudo variable to represent each predefined alias class; and, for each variable included within each said respective predefined alias class, means for attaching each said respective pseudo variable to each said corresponding set-list and each said corresponding check-list; and variable updating means utilizing said set-lists and said check-lists for data flow analysis and for optimizing the source program; and means utilizing said optimized source program for generating the object code.

16. A compiler as recited in claim 15 wherein said variable updating means utilizing said set-lists and said check-lists for data flow analysis and for optimizing the source program include means utilizing said set-lists for direct alias checking.

17. A compiler as recited in claim 16 wherein said variable updating means utilizing said set-lists and said check-lists for data flow analysis and for optimizing the source program include means utilizing said check-lists for inverse alias checking.

18. A compiler as recited in claim 15 wherein said variable updating means utilizing said set-lists and said check-lists for data flow analysis and for optimizing the source program include means for identifying a last defined variable or pseudo variable attached to said corresponding check-list for a selected variable.

19. A compiler as recited in claim 15 further includes means for attaching an empty set-list and an empty check-list of each variable to initialize said aliasing data structure defining means.

20. A compiler as recited in claim 15 further includes means for setting each variable to undefined to initialize said aliasing data structure defining means.

21. A compiler as recited in claim 15 wherein said means for defining a respective pseudo variable to represent each predefined alias class includes means for constructing a respective pseudo variable to represent each redefinition group of variables potentially redefined at a point in the source program.

\* \* \* \* \*